US012763399B2

(12) United States Patent
Hwang et al.

(10) Patent No.: US 12,763,399 B2
(45) Date of Patent: Oct. 13, 2026

(54) COMPOSITE PAD AND BATTERY MODULE INCLUDING THE SAME

(71) Applicant: SK ON CO., LTD., Seoul (KR)

(72) Inventors: Jeong Tae Hwang, Daejeon (KR); You Kyung Park, Daejeon (KR); Sang Gi Shim, Daejeon (KR); So Mi Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 646 days.

(21) Appl. No.: 18/348,639

(22) Filed: Jul. 7, 2023

(65) Prior Publication Data

US 2024/0097235 A1 Mar. 21, 2024

(30) Foreign Application Priority Data

Sep. 20, 2022 (KR) ........................ 10-2022-0118683

(51) Int. Cl.

*H01M 10/6555* (2014.01)
*H01M 10/615* (2014.01)
*H01M 10/653* (2014.01)
*H01M 50/209* (2021.01)

(52) U.S. Cl.

CPC ..... *H01M 10/6555* (2015.04); *H01M 10/615* (2015.04); *H01M 10/653* (2015.04); *H01M 50/209* (2021.01)

(58) Field of Classification Search

CPC ........... H01M 10/6555; H01M 10/615; H01M 50/209

See application file for complete search history.

(56) References Cited

U.S. PATENT DOCUMENTS

2017/0025722 A1* 1/2017 Bulgajewski .......... H05B 3/146
2018/0090949 A1* 3/2018 Lim .................... H01M 10/653
2022/0173453 A1* 6/2022 Jo ..................... H01M 10/6551

FOREIGN PATENT DOCUMENTS

KR 10-1878834 B1 7/2018
KR 10-2022-0019157 A 2/2022

* cited by examiner

*Primary Examiner* — Jonathan G Jelsma
(74) *Attorney, Agent, or Firm* — Jones Day

(57) ABSTRACT

A composite pad and a battery cell assembly and a battery module including the composite pad are disclosed. In some implementations, the battery cell assembly comprises a plurality of battery cells arranged in a direction, and one or more pads, each pad disposed between two adjacent battery cells of the plurality of battery cells, at least one of the one or more pads including a pad body with elasticity, and a heat generating part coupled to the pad body and connected to an edge of the at least one of the one or more pads and configured to generate heat upon application of electric power to the heat generating part.

20 Claims, 12 Drawing Sheets

COMPOSITE PAD AND BATTERY MODULE INCLUDING THE SAME

CROSS-REFERENCE TO RELATED APPLICATIONS

This patent document claims the priority and benefits of Korean Patent Application No. 10-2022-0118683 filed on Sep. 20, 2022, which is incorporated herein by reference in its entirety.

TECHNICAL FIELD

The technology and implementations disclosed in this patent document generally relate to a composite pad and a battery module including the same.

BACKGROUND

A battery module includes battery cells arranged in the battery module and can exhibit its optimal performance when operating at an appropriate temperature range. If the battery module operates outside the appropriate temperature range, e.g., at a very low temperature, the performance of the battery module may be limited, and the battery cells in the battery module may be damaged.

SUMMARY

The disclosed technology can be implemented in some embodiments to address the issues discussed in this patent document.

The disclosed technology can be implemented in some embodiments to provide an elastic composite pad capable of heating a battery cell and a battery module that includes the elastic composite pad.

The disclosed technology can be implemented in some embodiments to provide a composite pad capable of heating a battery cell while having both elasticity and thermal conductivity properties and a battery module including the composite pad.

The disclosed technology can be implemented in some embodiments to provide a composite pad that includes an elastic pad body formed on at least a portion of a face of the composite pad and at least a portion of another face of the composite pad, and a battery module including the composite pad.

The disclosed technology can be implemented in some embodiments to provide a slim composite pad and a battery module including the composite pad.

The disclosed technology can be implemented in some embodiments to provide a battery module with improved space efficiency.

The disclosed technology can be implemented in some embodiments to provide a composite pad capable of simultaneously cooling and heating a battery cell and a battery module including the composite pad.

The disclosed technology can be implemented in some embodiments to provide a cell assembly comprising a plurality of battery cells stacked in a direction; and a pad disposed between two adjacent battery cells among the plurality of battery cells, the pad including a first pad face and a second pad face positioned opposite to the first pad face, wherein the pad includes a pad body with elasticity, and a heat generating part coupled to the pad body and connected to an edge of the pad, wherein the heat generating part generates heat when an electric power is provided to the heat generating part.

The disclosed technology can be implemented in some embodiments to provide a battery module comprising a cell assembly including a plurality of battery cells stacked in a direction; a case accommodating the cell assembly; and a pad disposed between two adjacent battery cells among the plurality of battery cells, the pad including a first pad face and a second pad face positioned opposite to the first pad face, wherein the pad includes a pad body with elasticity, and a heat generating part coupled to the pad body and connected to an edge of the pad, wherein the heat generating part generates heat when an electric power is provided to the heat generating part.

In some embodiments of the disclosed technology, a battery cell assembly may include a plurality of battery cells arranged in a direction, and one or more pads, each pad disposed between two adjacent battery cells of the plurality of battery cells, at least one of the one or more pads including a pad body with elasticity, and a heat generating part coupled to the pad body and extending toward an edge of the at least one of the one or more pads, and configured to generate heat upon application of electric power to the heat generating part.

In some embodiments of the disclosed technology, a battery module may include a battery cell assembly including a plurality of battery cells arranged in a direction, a battery module case structured to accommodate the battery cell assembly, and one or more pads, each pad disposed between two adjacent battery cells of the plurality of battery cells, at least one of the one or more pads including a pad body with elasticity, and a heat generating part coupled to the pad body and extending toward an edge of the at least one of the one or more pads and configured to generate heat upon application of electric power to the heat generating part.

The disclosed technology, the disclosed technology can be implemented in some embodiments to provide a composite pad with elasticity capable of heating a battery cell and a battery module including the composite pad.

The disclosed technology, the disclosed technology can be implemented in some embodiments to provide a composite pad capable of heating a battery cell while having both elasticity and thermal conductivity properties and a battery module including the composite pad.

The disclosed technology can be implemented in some embodiments to provide a composite pad that includes a pad body with elasticity formed on at least a portion of a face of the composite pad and at least a portion of another face of the composite pad, and a battery module including the composite pad.

The disclosed technology can be implemented in some embodiments to provide a slim composite pad and a battery module including the composite pad.

The disclosed technology can be implemented in some embodiments to provide a battery module with improved space efficiency.

The disclosed technology can be implemented in some embodiments to provide a composite pad capable of simultaneously cooling and heating a battery cell and a battery module including the composite pad.

DETAILED DESCRIPTION

Figure 1:
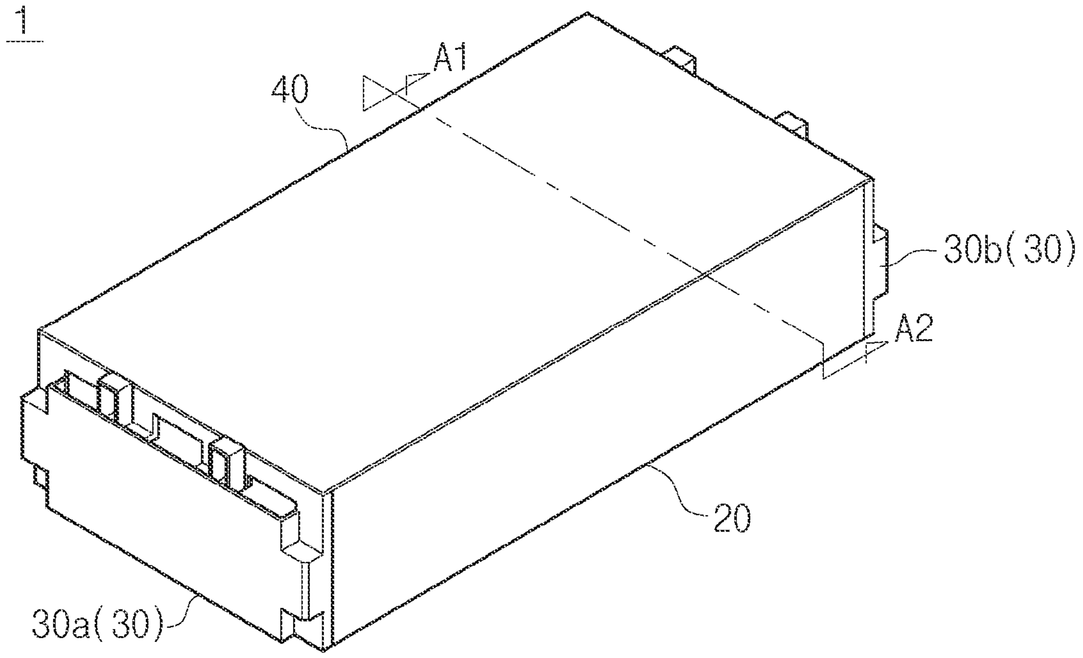
FIG. 1 illustrates an example of a battery module based on an embodiment of the disclosed technology.

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosed technology, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosed technology should be construed to extend to any alterations, equivalents and substitutes in addition to those which are particularly set out in the accompanying drawings.

The terms including an ordinal number such as first, second, etc. may be used to describe various components, but the components are not limited by such terms. The terms are used only for the purpose of distinguishing one component from other components.

When any component is described as "being connected" or "being coupled" to other component, this should be understood to mean that another component may exist between them, although any component may be directly connected or coupled to the other component. In contrast, when any component is described as "being directly connected" or "being directly coupled" to other component, this should be understood to mean that no component exists between them.

A singular expression can include a plural expression as long as it does not have an apparently different meaning in context.

In the disclosed technology, terms "include" and "have" should be understood to be intended to designate that illustrated features, numbers, steps, operations, components, parts or combinations thereof are present and not to preclude the existence of one or more different features, numbers, steps, operations, components, parts or combinations thereof, or the possibility of the addition thereof.

In the drawings, sizes of the components may be exaggerated or reduced for convenience of explanation. For example, the size and the thickness of each component illustrated in the drawings are arbitrarily illustrated for convenience of explanation, and thus the disclosed technology is not limited thereto unless specified as such.

If any embodiment is implementable differently, a specific order of processes may be performed differently from the order described. For example, two consecutively described processes may be performed substantially at the same time, or performed in the order opposite to the described order.

In the following embodiments, when layers, areas, components, etc. are connected, the following embodiments include both the case where layers, areas, and components are directly connected, and the case where layers, areas, and components are indirectly connected to other layers, areas, and components intervening between them. For example, when layers, areas, components, etc. are electrically connected, the disclosed technology includes both the case where layers, areas, and components are directly electrically connected, and the case where layers, areas, and components are indirectly electrically connected to other layers, areas, and components intervening between them.

The disclosed technology can be implemented in some embodiments to provide an elastic composite pad capable of heating a battery cell and a battery module including the composite pad.

A battery module includes battery cells arranged in the battery module. In an attempt to prevent damage to the battery cells, the battery module can include a buffer layer such as an elastic pad between the battery cells to absorb volume changes resulting from swelling of the battery cells. If the battery module operates outside the appropriate temperature range, e.g., at a very low temperature, the performance of the battery module may be limited, and the battery cells in the battery module may be damaged. In order to address these issues, a separate heating member may be disposed in the battery module to heat the battery cell to a desired elevated temperature for improved battery operations and performance.

In an implementation where an elastic pad and a heating member are separately provided, the fabrication process may be complicated and the overall volume of the battery module may increase. The disclosed technology can be implemented in some embodiments to address these issues by providing a pad that includes a combination of an elastic pad and a cooling member, and a battery module including the pad.

Figure 2:
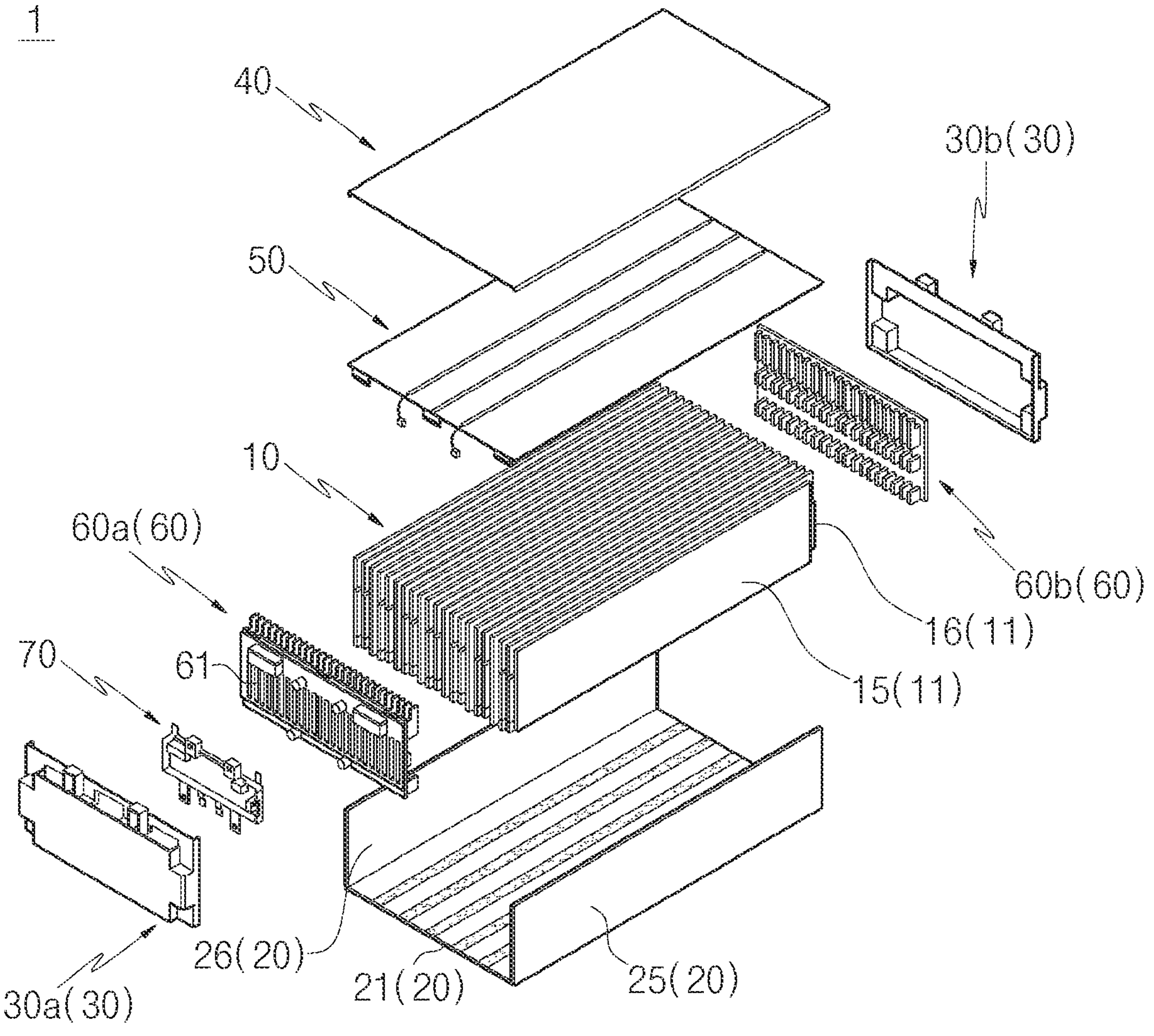
FIG. 2 is an exploded perspective view of the battery module of FIG. 1.

FIG. 1 illustrates an example of a battery module 1 based on an embodiment of the disclosed technology. FIG. 2 is an exploded perspective view of the battery module 1 of FIG. 1. In FIG. 2, illustration of a heat generating head 300 (see FIG. 4) may be omitted for convenience of description.

Referring to FIGS. 1 and 2, the battery module 1 may include a housing 20. The housing 20 may form an upwardly open shape. The housing 20 may form a front-rear open shape. The housing 20 may form an accommodation space. In other words, the accommodation space formed in the housing 20 may be opened upward, forward and backward.

The housing 20 may include a bottom plate 21. The bottom plate 21 may form a bottom of the housing 20. An upper face of the bottom plate 21 may face the accommodation space formed in the housing 20. A lower face of the bottom plate 21 may exchange heat with an external cooling device. For example, the lower face of the bottom plate 21 may exchange heat with a coolant of the external cooling device. The bottom plate 21 may be referred to as a "cooling plate".

The bottom plate 21 may be formed of a material with high thermal conductivity. For example, the bottom plate 21 may be formed of a material including aluminum. For example, the bottom plate 21 may easily dissipate heat generated in a battery group 10 to the outside.

The housing 20 may include side plates 25 and 26. The side plates 25 and 26 may include a first side plate 25 and a second side plate 26. The side plates 25 and 26 may indicate at least one of the first side plate 25 and the second side plate 26.

The side plates 25 and 26 may form a unibody with the bottom plate 21. For example, the side plates 25 and 26 and the bottom plate 21 may form a unibody through an extrusion process or the like.

The side plates 25 and 26 may extend upward from the bottom plate 21. For example, the side plates 25 and 26 may form a shape extending upward from both sides of the bottom plate 21. For example, the first side plate 25 may form a shape extending upward from a first edge 215 (see FIG. 3) of the bottom plate 21. For example, the second side plate 26 may form a shape extending upward from a second edge 216 (see FIG. 3) of the bottom plate 21. The first edge 215 (see FIG. 3) of the bottom plate 21 may be positioned opposite the second edge 216 (see FIG. 3) of the bottom plate 21.

The side plates 25 and 26 may be formed of a material including a thermal insulation material. For example, the side plates 25 and 26 may minimize a temperature difference between a plurality of battery cells 11.

The battery module 1 may include the battery group 10. The battery group 10 may include the plurality of battery cells 11. The battery group 10 may be formed by stacking the plurality of battery cells 11. The battery group 10 may be accommodated in the housing 20. For example, the battery group 10 may be positioned on the bottom plate 21. For example, the battery group 10 may be positioned between the first side plate 25 and the second side plate 26.

The plurality of battery cells 11 may be consecutively arranged. For example, the plurality of battery cells 11 may be consecutively disposed between the first side plate 25 and the second side plate 26. For example, the first side plate 25, the plurality of battery cells 11, and the second side plate 26 may be sequentially disposed. Pads 100 may be spatially interleaved with the plurality of battery cells 11 so that a pad 100 may be positioned between two adjacent battery cells 11 (see FIG. 4). The plurality of battery cells 11 and the pads 100 (see FIG. 4) may be referred to as a cell assembly. For example, the cell assembly may include the plurality of battery cells 11 and the pads 100 (see FIG. 4).

The battery cell 11 may indicate one of the plurality of battery cells 11. The battery cell 11 may include a cell body 15. The cell body 15 may form a shape that extends from one end and leads to other end. The cell body 15 may include an electrode assembly. The electrode assembly may include an anode, a cathode, a separator, and the like.

The battery cell 11 may include an electrode tab 16. The electrode tab 16 may be positioned at one end and other end of the cell body 15. The one end and the other end of the cell body 15 may indicate one end and the other end of the battery group 10, respectively.

The electrode tab 16 positioned at one end of the battery cell 11 may be referred to as a "first electrode tab". The electrode tab 16 positioned at the other end of the battery cell 11 may be referred to as a "second electrode tab".

The battery module 1 may include a cover part 30. The cover part 30 may be coupled to the housing 20. The cover part 30 may cover the accommodation space formed in the housing 20. For example, the housing 20 may cover an upper side and front and rear sides of the housing 20.

The cover unit 30 may include a front cover part 30*a*. The front cover part 30*a* may be coupled or connected to a front end of the housing 20. The front cover part 30*a* may face one end of the battery group 10.

The cover part 30 may include a rear cover part 30*b*. The rear cover part 30*b* may be coupled or connected to a rear end of the housing 20. The rear cover part 30*b* may face the other end of the battery group 10.

The cover part 30 may include an upper cover part 40. The upper cover part 40 may be coupled or connected to an upper end of the housing 20. The upper cover part 40 may face the upper end of the battery group 10. The upper cover part 40 may be coupled or connected to the front cover part 30*a* and the rear cover part 30*b*.

The housing 20, the cover part 30, and the upper cover part 40 may form a case of the battery module 1. The cases 20, 30, and 40 may indicate at least one of the housing 20, the cover part 30, and the upper cover part 40.

The battery module 1 may include a bus bar assembly 60. A plurality of bus bar assemblies 60 may be provided. For example, the bus bar assembly 60 may include a first bus bar assembly 60*a* and a second bus bar assembly 60*b*. The bus bar assembly 60 may indicate at least one of the first bus bar assembly 60*a* and the second bus bar assembly 60*b*.

The first bus bar assembly 60*a* may be positioned between the front cover part 30*a* and the battery group 10. The first bus bar assembly 60*a* may be coupled or connected to the first electrode tabs 16 of the plurality of battery cells 11.

The second bus bar assembly 60*b* may be positioned between the rear cover part 30*b* and the battery group 10. The second bus bar assembly 60*b* may be coupled or connected to the second electrode tabs 16 of the plurality of battery cells 11.

The bus bar assembly 60 may include a plurality of slits 61. The electrode tabs 16 of the plurality of battery cells 11 may be inserted into the plurality of slits 61. The number of slits 61 may correspond to the number of electrode tabs 16.

The battery module 1 may include a sensor assembly 50. The sensor assembly 50 may be positioned between the upper cover part 40 and the battery group 10. The sensor assembly 50 may have a plate shape. The sensor assembly 50 may cover the battery group 10.

The sensor assembly 50 may be connected to the bus bar assembly 60. For example, one end of the sensor assembly 50 may be connected to the first bus bar assembly 60*a*. For example, other end of the sensor assembly 50 may be connected to the second bus bar assembly 60*b*. The sensor assembly 50 may electrically connect the first bus bar assembly 60*a* and the second bus bar assembly 60*b*.

The battery module 1 may include a sensor substrate 70. The sensor substrate 70 may be positioned between the bus bar assembly 60 and the cover part 30. For example, the sensor substrate 70 may be positioned between the first bus bar assembly 60*a* and the front cover part 30*a*.

The sensor substrate 70 may be connected to the bus bar assembly 60. For example, the sensor substrate 70 may be connected to the first bus bar assembly 60*a*. The sensor substrate 70 may receive an electrical signal from the bus bar assembly 60. The sensor substrate 70 may obtain information on a voltage state of the battery group 10.

Figure 3:
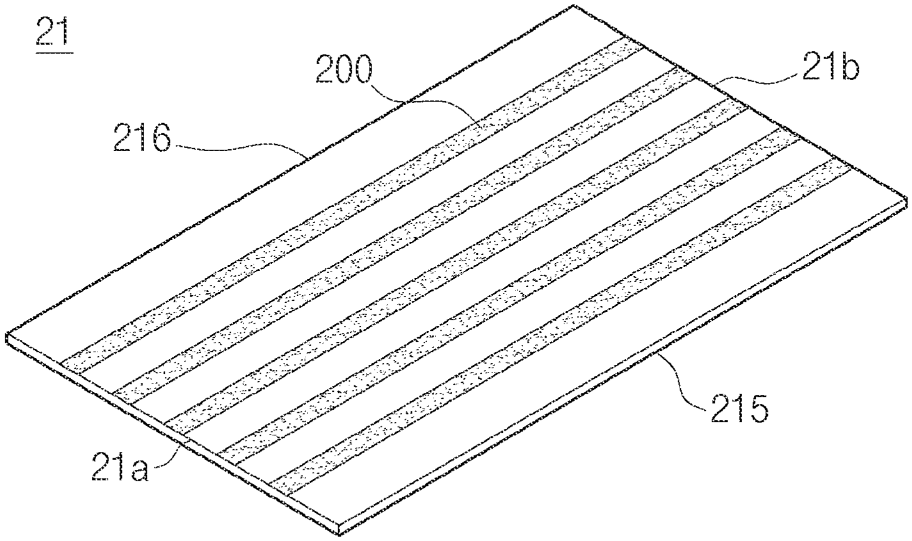
FIG. 3 illustrates an example of a bottom plate based on an embodiment of the disclosed technology.

FIG. 3 illustrates an example of a bottom plate based on an embodiment of the disclosed technology.

Referring to FIG. 3, the upper face of the bottom plate 21 may be observed. A heat transfer unit 200 may be positioned on the upper face of the bottom plate 21. In FIG. 3, a remaining portion except for the heat transfer unit 200 may indicate the bottom plate 21. The bottom plate 21 may form a shape of a panel or a plate. The bottom plate 21 may form a plurality of edges.

For example, the bottom plate 21 may include a front bottom edge 21*a* and a rear bottom edge 21*b*. The front bottom edge 21*a* may be positioned opposite the rear bottom edge 21*b*. The front bottom edge 21*a* and the rear bottom edge 21*b* may form a portion of a perimeter of the bottom plate 21.

The front bottom edge 21*a* may form a front end of the bottom plate 21. The rear bottom edge 21*b* may form a rear end of the bottom plate 21. The bottom plate 21 may form a shape that extends rearward from the front bottom edge 21*a* and leads to the rear bottom edge 21*b*.

For example, the bottom plate 21 may include a first bottom edge 215 and a second bottom edge 216. The first bottom edge 215 and the second bottom edge 216 may face each other. The first bottom edge 215 may be positioned opposite the second bottom edge 216. The first bottom edge 215 and the second bottom edge 216 may form other part of the perimeter of the bottom plate 21.

The first bottom edge 215 and the second bottom edge 216 may connect the front bottom edge 21*a* and the rear bottom edge 21*b*. The first bottom edge 215 may extend from one end of the front bottom edge 21*a* and lead to one end of the rear bottom edge 21*b*. The second bottom edge 216 may extend from other end of the front bottom edge 21*a* and lead to other end of the rear bottom edge 21*b*.

The first bottom edge 215 and the second bottom edge 216 may be connected or coupled to the side plates 25 and 26 (see FIG. 2). For example, the first side plate 25 (see FIG. 2) may form a shape extending upward from the first bottom edge 215. For example, the second side plate 26 (see FIG. 2) may form a shape extending upward from the second bottom edge 216.

The heat transfer unit 200 may be formed or positioned on one face of the bottom plate 21. For example, the heat transfer unit 200 may be formed or positioned on the upper face of the bottom plate 21. The heat transfer unit 200 may be positioned between the bottom plate 21 and the battery group 10 (see FIG. 2).

For example, the heat transfer unit 200 may include a filler or a gap filler with good thermal conductivity. The heat transfer unit 200 may include a thermally conductive material. For example, the heat transfer unit 200 may include a thermally conductive resin. For example, the heat transfer unit 200 may include a thermally conductive adhesive. For example, the heat transfer unit 200 may include at least one of an acrylic-based resin, a urethane-based resin, an epoxy-based resin, an olefin-based resin, and a silicone-based resin.

For example, the heat transfer unit 200 may connect or couple the bottom plate 21 and the battery group 10 (see FIG. 2). For another example, the heat transfer unit 200 may connect or couple the pad 100 (see FIG. 4) and the bottom plate 21.

The heat transfer unit 200 may be positioned on the upper face of the bottom plate 21. For example, the heat transfer unit 200 may be distributed on the entire upper face of the bottom plate 21. For another example, the heat transfer unit 200 may be distributed on a portion of the upper face of the bottom plate 21. For example, an area in which the heat transfer unit 200 is distributed in the bottom plate 21 may correspond to the position of the pad 100 (see FIG. 4).

Figure 4:
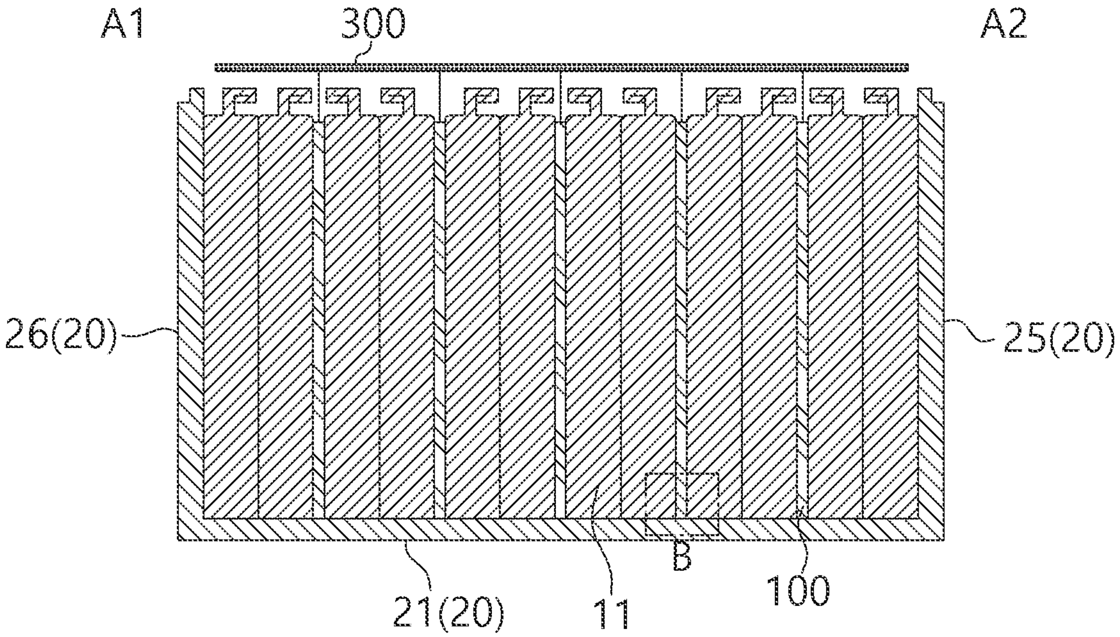
FIG. 4 illustrates a cross section of the battery module taken along A1-A2 of FIG. 1.
Figure 5:
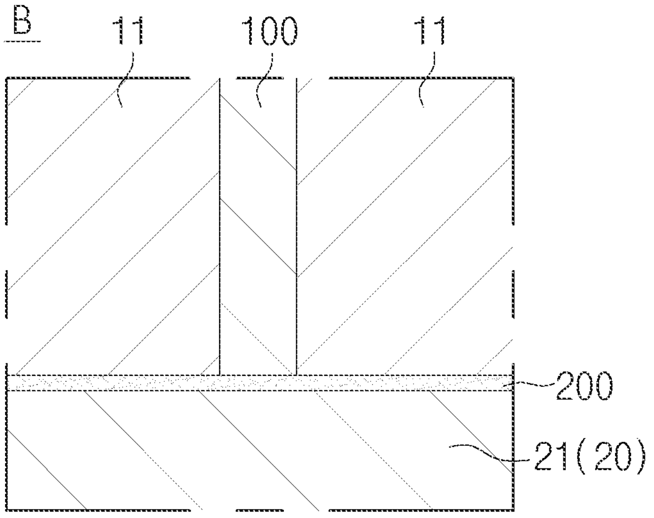
FIG. 5 illustrates a portion "B" of FIG. 4.

FIG. 4 illustrates a cross section of the battery module 1 taken along A1-A2 of FIG. 1. In FIG. 4, illustration of the upper cover part 40 (see FIG. 2) may be omitted for convenience of description. FIG. 5 illustrates a portion "B" of FIG. 4.

Referring to FIGS. 4 and 5, the battery module 1 may include the pad 100. A plurality of pads 100 may be provided. The pad 100 may indicate one of the plurality of pads 100.

The plurality of pads 100 and the plurality of battery cells 11 may be disposed between the first side plate 25 and the second side plate 26. For example, the plurality of pads 100 and the plurality of battery cells 11 may be arranged to be stacked in a direction.

For example, the pad 100 may be disposed between a pair of battery cells 11 and another pair of battery cells 11 adjacent to the pair of battery cells 11. For another example, the pad 100 may be disposed between a battery cell 11 and another battery cell 11 adjacent to the battery cell 11. As illustrated in the example in FIG. 4, different pads 100 are spatially interleaved with the battery cells.

The pad 100 may be designed to exhibit a desired degree of elasticity so that the spas 100 can deform or be compressed under a pressure and can restore its shape or volume when the applied pressure is reduced. This property of the pad 100 enables the battery module to reduce deformation as the temperature changes. For example, the pad 100 may be formed of a material containing a resin that can shrink and expand. For example, the pad 100 may be formed of a material containing urethane. When the battery cell 11 swells due to over-heating or the like, a pressure may be applied to other battery cells 11 adjacent to the swollen battery cell 11. The pad 100 may buffer the pressure applied to the battery cell 11. In this context, the pad 100 may be referred to as an "elastic pad" in this patent document. The pad 100 may be an electrical insulator.

The pad 100 may be designed to exhibit a desired amount of thermal conductivity to transfer heat through the pad 100 so allow head to be spatially distributed throughout the battery cell stack. For example, the pad 100 may include a thermally conductive resin. For example, the pad 100 may include a gap filler. For example, the pad 100 may include at least one of a silicone-based resin and a polyurethane resin. In this context, the pad 100 may be referred to as a "thermal conductive pad".

The pad 100 may be designed to generate heat to raise the temperature of batter cells 11 when needed. For example, the pad 100 may be in contact with the adjacent battery cell 11 and provide heat to the battery cell 11 when the battery cell temperature is below a desired temperature range at a undesired low temperature that may adversely impact the battery operation or performance. When a temperature of the battery cell 11 is lower than a specific temperature, a function of the battery cell 11 may significantly deteriorate or the battery cell 11 may malfunction. When the pad 100 generates heat, the temperature of the battery cell 11 may increase, thus reducing the battery deterioration. In this context, the pad 100 may be referred to as a "heat generating pad".

The pad 100 may be referred to as a "composite pad" in that it can have both elasticity and thermal conductivity. In the illustrated example, the composite pad 100 includes different parts, e.g., the pad body 110 and the heat generating part 120. From another perspective, the pad 100 may be referred to as a "composite pad" in that it can have both elasticity and heat generation properties. Alternatively, the pad 100 may be referred to as a "composite pad" in that it can have all of elasticity, thermal conductivity, and heat generation properties.

The pad 100 may be connected to the bottom plate 21. For example, the heat transfer unit 200 may connect the pad 100 and the bottom plate 21. The heat transfer unit 200 may be positioned between the pad 100 and the bottom plate 21. The heat transfer unit 200 may be coupled or attached to each of the pad 100 and the bottom plate 21.

Heat generated in the battery cell 11 may be transferred to the pad 100. The pad 100 may transfer at least a portion of the heat transferred from the battery cell 11 to the heat transfer unit 200. The heat transfer unit 200 may transfer at least a portion of heat transferred from at least one of the pad 100 and the battery cell 11 to the bottom plate 21.

The battery module 1 (see FIG. 1) may include the heat generating head 300. The heat generating head 300 may be disposed between the battery group 10 (see FIG. 2) and the upper cover part 40. For another example, the heat generating head 300 may be disposed between the battery group 10 (see FIG. 2) and the sensor assembly 50 (see FIG. 2). The heat generating head 300 may be adjacent to the battery group 10 (see FIG. 2).

The heat generating head 300 may be connected to the pad 100 to allow transfer of energy from the heat generating head 300 to the pad 100 to allow transfer of energy from the heat generating head 300 to the pad 100. For example, the pad 100 may be electrically connected to the heat generating head 300. The heat generating head 300 may provide electric power to the pad 100. When the heat generating head 300 provides electric power to the pad 100, the pad 100 may generate heat.

Figure 8:
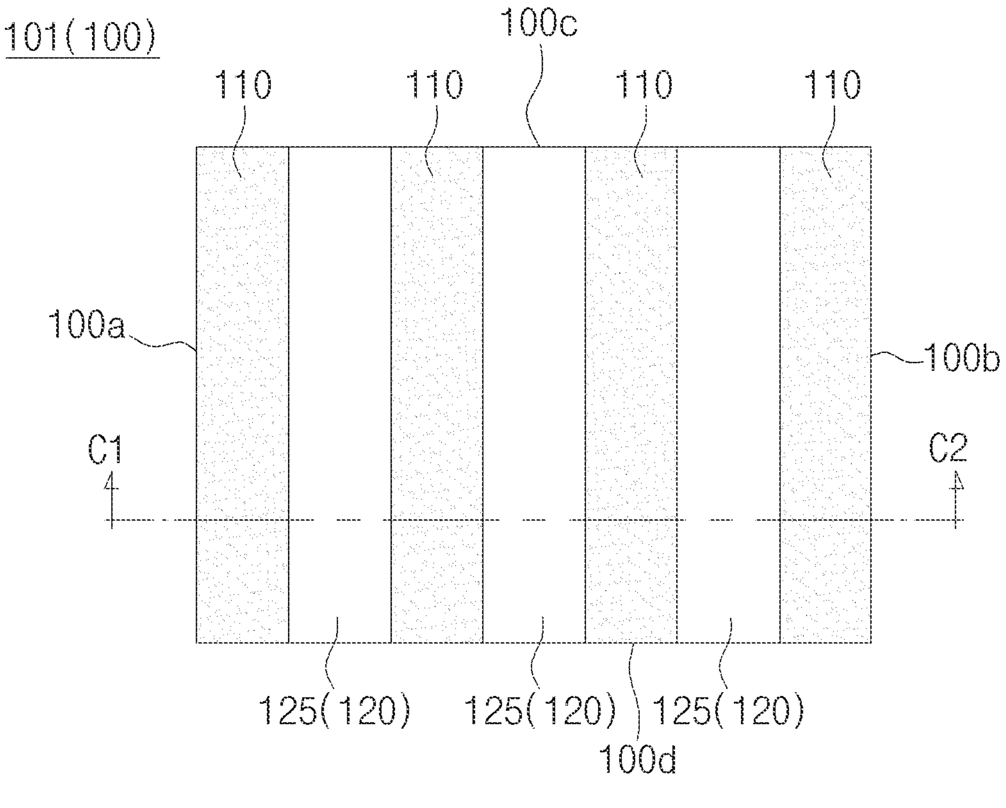
FIG. 8 illustrates one face of a pad based on an embodiment of the disclosed technology.

For example, the pad 100 may include a heat generating part 120 that emits heat (see FIG. 8). The heat generating part 120 (see FIG. 8) may be connected to the heat generating head 300 and may receive electric power from the heat generating head 300. The heat generating part 120 (see FIG. 8) may convert the electric power into heat. Heat generating units 300 and 120 (see FIG. 8) may include the heat generating head 300 and the heat generating part 120 (see FIG. 8).

Figure 6:
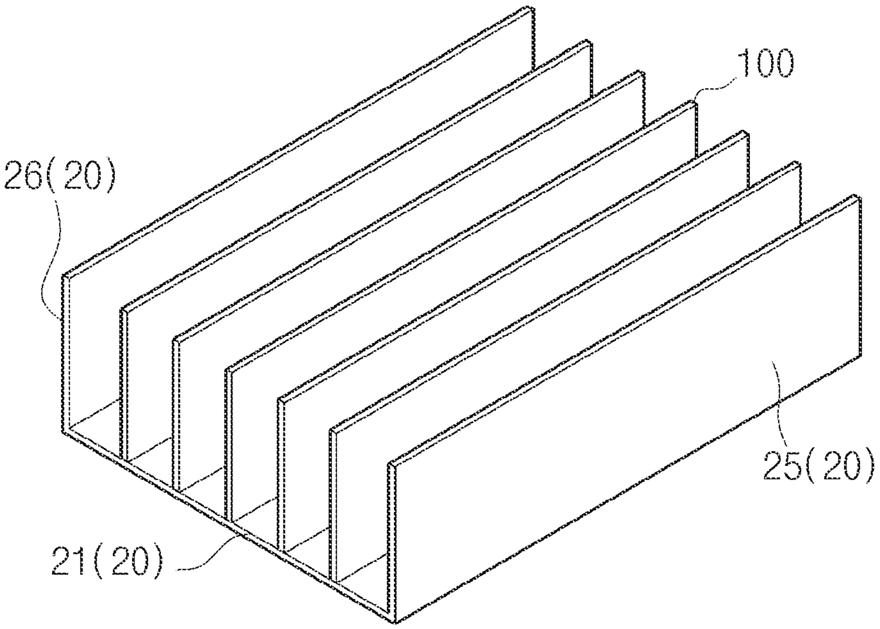
FIG. 6 illustrates an example arrangement of a housing and a plurality of pads.

FIG. 6 illustrates an example arrangement of the housing 20 and the plurality of pads 100.

Referring to FIG. 6, the plurality of pads 100 may be spaced apart from each other. For example, the plurality of pads 100 may be sequentially arranged at regular intervals. The plurality of pads 100 may be disposed between the first side plate 25 and the second side plate 26. For example, the first side plate 25, the plurality of pads 100, and the second side plate 26 may be sequentially disposed.

The pad 100 may form a shape of a panel or a plate. One face of the pad 100 may be directed toward the first side plate 25. Other face of the pad 100 may be directed toward the second side plate 25. Among both adjacent pads 100, one face of one pad 100 may face the other face of the other pad 100.

Figure 7:
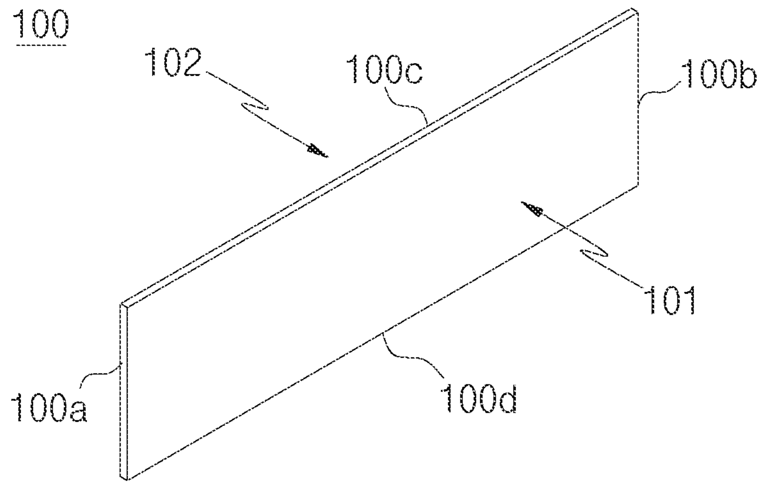
FIG. 7 illustrates an example of a pad.

FIG. 7 illustrates an example of the pad 100.

Referring to FIGS. 6 and 7, the pad 100 may form a shape that extends from one end and leads to other end. One end of the pad 100 may be adjacent to one end of the housing 20. For example, one end of the pad 100 may be adjacent to one end of the bottom plate 21. For example, one end of the pad 100 may be directed toward or may face the front cover part 30*a* (see FIGS. 1 and 2). For example, one end of the pad 100 may be directed toward or may face the first bus bar assembly 60*a* (see FIG. 2).

The other end of the pad 100 may be adjacent to the other end of the housing 20. For example, the other end of the pad 100 may be adjacent to the other end of the bottom plate 21. For example, the other end of the pad 100 may be directed toward or may face the rear cover part 30*b* (see FIGS. 1 and 2). For example, the other end of the pad 100 may be directed toward or may face the second bus bar assembly 60*b* (see FIG. 2).

The pad 100 may form both faces. For example, a first pad face 101 of the pad 100 may be one surface of the pad 100. For example, a second pad face 102 of the pad 100 may be the other surface of the pad 100. The first pad face 101 may be directed toward or may face the first side plate 25 (see FIG. 2). The second pad face 102 may be directed toward or may face the second side plate 26 (see FIG. 2).

The pad 100 may form a plurality of edges. A plurality of edges 100*a*, 100*b*, 100*c*, and 100*d* of the pad 100 may form a perimeter of the pad 100. For example, the perimeter of the pad 100 may include the plurality of edges 100*a*, 100*b*, 100*c*, and 100*d*.

For example, the plurality of edges 100*a*, 100*b*, 100*c*, and 100*d* may form a perimeter of the first pad face 101. For example, the plurality of edges 100*a*, 100*b*, 100*c*, and 100*d* may form a perimeter of the second pad face 102.

The plurality of edges 100*a*, 100*b*, 100*c*, and 100*d* may include a first pad edge 100*a*. The first pad edge 100*a* may form one end of the pad 100. For example, the first pad edge 100*a* may form a front end of the pad 100. The first pad edge 100*a* may be referred to as a "front pad edge".

The plurality of edges 100*a*, 100*b*, 100*c*, and 100*d* may include a second pad edge 100*b*. The second pad edge 100*b* may form other end of the pad 100. For example, the second pad edge 100*b* may form a rear end of the pad 100. The second pad edge 100*b* may be positioned opposite the first pad edge 100*a*. The second pad edge 100*b* may be referred to as a "rear pad edge".

The plurality of edges 100*a*, 100*b*, 100*c*, and 100*d* may include a third pad edge 100*c*. The third pad edge 100*c* may form an upper end of the pad 100. The third pad edge 100*c* may be directed toward or may face the upper cover part 40 (see FIG. 2). The third pad edge 100*c* may be referred to as an "upper pad edge".

The plurality of edges 100*a*, 100*b*, 100*c*, and 100*d* may include a fourth pad edge 100*d*. The fourth pad edge 100*d* may be positioned opposite the third pad edge 100*c*. The fourth pad edge 100*d* may form a lower end of the pad 100. The fourth pad edge 100*d* may be directed toward or may face the bottom plate 21 (see FIG. 2). The fourth pad edge 100*d* may contact or may be coupled to the heat transfer unit 200 (see FIG. 5). The fourth pad edge 100*d* may be referred to as a "lower pad edge".

FIG. 8 illustrates one face of a pad based on an embodiment of the disclosed technology.

Referring to FIG. 8, the first pad face 101 of the pad 100 may be observed. The pad 100 may include a pad body 110. The pad body 110 may have elasticity. For example, the pad body 110 may be formed of a material containing a resin. For example, the pad body 110 may be formed of a material containing urethane. The pad body 110 may be referred to as a "face pressure part". The pad body 110 may form at least a portion of the first pad face 101. The pad body 110 may be electrically an insulator.

The pad 100 may include the heat generating part 120. The heat generating part 120 may be coupled to the pad body 110. The heat generating part 120 may form at least a portion of the first pad face 101.

The heat generating part 120 may form a shape extending downward from, for example, the third pad edge 100*c*. For example, the heat generating part 120 may include a heat generating column 125 extending downward from the third pad edge 100*c*. The heat generating column 125 may receive electric power to generate heat.

At least a portion of the heat generating part 120 may have thermal conductivity. For example, at least a portion of the heat generating part 120 may be formed of a material including a thermally conductive resin. For example, an outer surface of the heat generating part 120 may be formed of a material including a thermally conductive resin. For example, the outer surface of the heat generating part 120 may be formed of a material containing at least one of a silicone-based resin and a polyurethane resin.

Since the heat generating part 120 has thermal conductivity, at least a portion of heat generated in the battery cell 11 (see FIG. 4) can be effectively transferred to the heat generating part 120. At least a portion of the heat transferred to the heat generating part 120 may be transferred to the bottom plate 21 (see FIG. 5) through the heat transfer unit 200 (see FIG. 5). At least a portion of the heat transferred to the bottom plate 21 (see FIG. 5) may be discharged to the outside.

Hence, the heat generating part 120 can apply heat to the battery cell 11 (see FIG. 5) and remove the heat from the battery cell 11 (see FIG. 5).

A plurality of heat generating parts 120 may be provided. For example, one pad 100 may include the plurality of heat generating parts 120. The plurality of heat generating parts 120 may include a plurality of heat generating columns 125. The plurality of heat generating columns 125 may be spaced apart from each other. The plurality of heat generating columns 125 spaced apart from each other may be disposed in the front-rear direction.

A plurality of pad bodies 110 may be provided. For example, one pad 100 may include the plurality of pad bodies 110. The plurality of pad bodies 110 may be spaced apart from each other.

The plurality of pad bodies 110 spaced apart from each other may be disposed in the front-rear direction. The plurality of pad bodies 110 and the plurality of heat generating columns 125 may be alternately arranged in the front-rear direction.

For example, the pad body 110 may be disposed between the two adjacent heat generating columns 125. For example, the heat generating column 125 may be disposed between the two adjacent pad bodies 110.

Figure 9A:
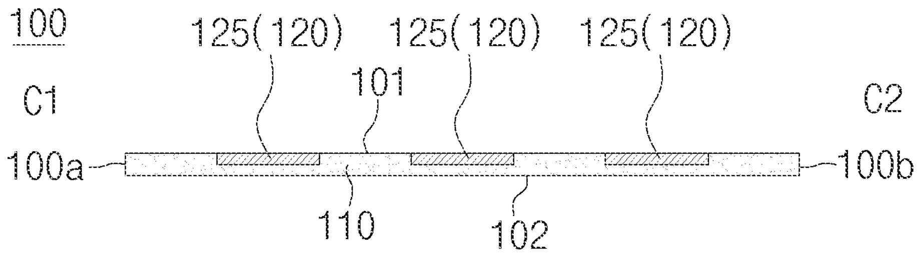
FIGS. 9A to 9C illustrate a cross section of the pad taken along C1-C2 of FIG. 8 based on some embodiments of the disclosed technology.
Figure 9B:
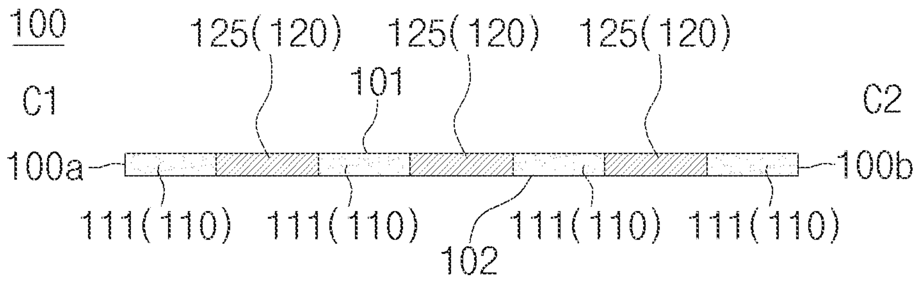
Figure 9C:
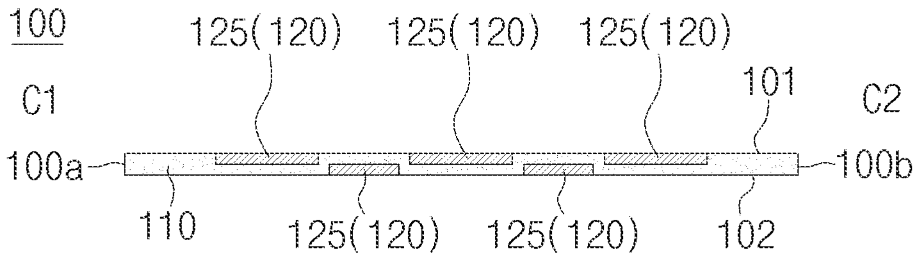

FIGS. 9A to 9C illustrate a cross section of the pad taken along C1-C2 of FIG. 8 based on some embodiments of the disclosed technology.

Referring to FIG. 9A, the plurality of heat generating parts 120 may form a portion of the first pad face 101. For example, the heat generating parts 120 may include the plurality of heat generating columns 125 spaced apart from the second pad face 102 when the heat generating parts 120 form a portion of the first pad face 101.

A process of forming the pad 100 is described. A concave groove may be formed in the first pad face 101 of the pad body 110. The heat generating part 120 may be disposed in the groove formed in the first pad face 101 of the pad body 110. The groove formed in the first pad face 101 may be referred to as a "first groove".

The heat generating part 120 may be accommodated in the first groove formed in the pad body 110. A plurality of first grooves may be provided and arranged to be spaced apart from each other. For example, the plurality of heat generating parts 120 may be accommodated and disposed in the plurality of first grooves formed in the pad body 110, respectively. The heat generating part 120 may be coupled to the groove formed in the pad body 110 through an adhesive. For example, the heat generating part 120 may be coupled to the pad body 110 through a curing agent.

A pair of pads 100 may be disposed between the two adjacent battery cells 11 (see FIG. 4). For example, a second pad face 102 of one pad 100 of the pair of pads 100 may contact a second pad face 102 of the other pad 100 of the pair of pads 100. Hence, the pair of pads 100 can provide heat and distribute pressure while facing and contacting the two adjacent battery cells 11 (see FIG. 4), respectively.

Referring to FIG. 9B, a plurality of heat generating columns 125 may be provided. Each of the plurality of heat generating columns 125 may extend from the first pad face 101 and lead to the second pad face 102.

The pad body 110 may be divided into a plurality of segments by the plurality of heat generating columns 125. The plurality of segments divided from the pad body 110 may be referred to as "a plurality of pad body segments". For example, the pad body 110 may include a plurality of pad body segments 111.

The plurality of heat generating columns 125 and the plurality of pad body segments 111 may be alternately disposed. For example, the plurality of heat generating columns 125 and the plurality of pad body segments 111 may be alternately disposed along the front-rear direction. That is, the plurality of heat generating columns 125 and the plurality of pad body segments 111 may be alternately disposed in a direction from the first pad edge 100*a* to the second pad edge 100*b*.

Referring to FIG. 9C, at least one heat generating column 125 may form a portion of the first pad face 101. At least one heat generating column 125 may form a portion of the second pad face 102. In other words, at least a portion of the plurality of heat generating columns 125 may form at least a portion of the first pad face 101, and other portion of the plurality of heat generating columns 125 may form at least a portion of the second pad face 102.

One heat generating column 125 disposed on the second pad face 102 may be positioned between the two adjacent heat generating columns 125 disposed on the first pad face 101. One heat generating column 125 disposed on the first pad face 101 may be positioned between the two adjacent heat generating columns 125 disposed on the second pad face 102.

That is, the plurality of heat generating columns 125 may be arranged in a zigzag shape. For example, the heat generating columns 125 disposed on the first pad face 101 and the heat generating columns 125 disposed on the second pad face 102 may be alternately disposed. For example, the heat generating columns 125 disposed on the first pad face 101 and the heat generating columns 125 disposed on the second pad face 102 may be alternately disposed in the front-rear direction. Through this arrangement, the elasticity of the pad body 110 can be effectively maintained, and at the same time the battery cells 11 (see FIG. 4) can be effectively heated.

A process of forming the pad 100 is described. A concave groove may be formed in each of the first pad face 101 and the second pad face 102 of the pad body 110. The heat generating parts 120 may be disposed in the grooves formed in the pad body 110. The groove formed in the second pad face 102 may be referred to as a "second groove".

Figure 10:
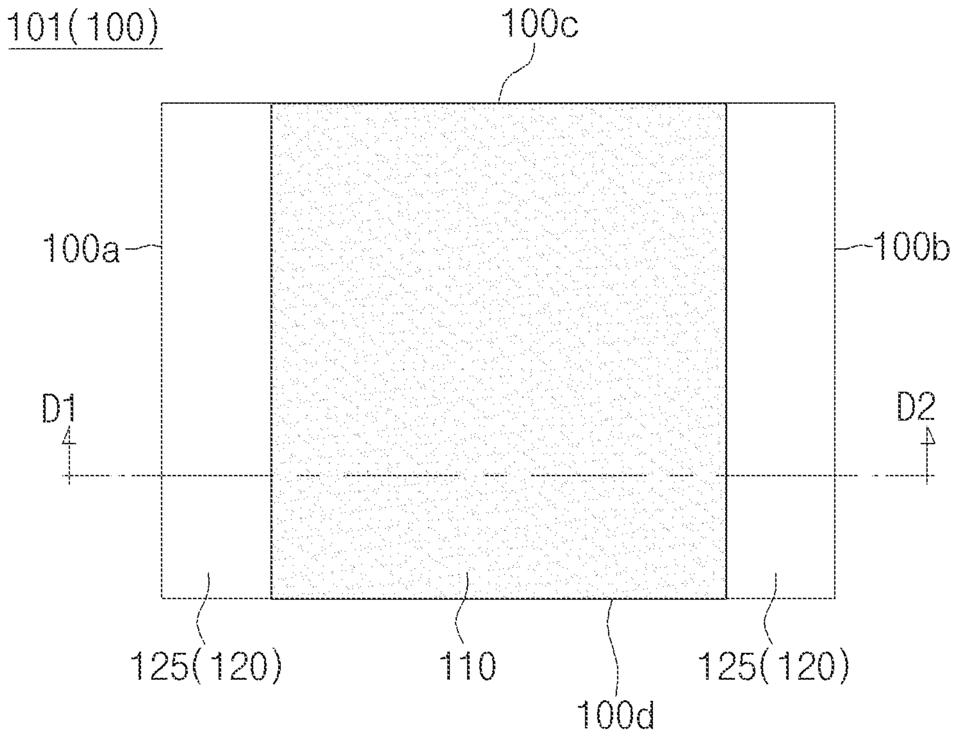
FIG. 10 illustrates one face of a pad that includes heat generating parts formed at both ends of the pad and a pad body formed between the heat generating parts.

FIG. 10 illustrates one face of a pad that includes heat generating parts formed at both ends of the pad and a pad body formed between the heat generating parts.

Referring to FIG. 10, the heat generating parts 120 may be formed at both ends of the pad 100. For example, both heat generating parts 120 may form the first pad edge 100*a* and the second pad edge 100*b*, respectively.

At least a portion of the pad body 110 may be disposed between both heat generating parts 120. The battery cell 11 (see FIG. 4) may be a pouch battery cell. When the pouch battery cell swells due to fire or the like, a central portion of the pouch battery cell may become convex. Since the pad body 110 with elasticity is disposed at a central portion of the pad 100, the pad 100 can effectively absorb or distribute pressure resulting from a change in the shape of the battery cell 11 (see FIG. 4).

FIGS. 11A to 11E illustrate a cross section of a pad taken along D1-D2 of FIG. 10 based on some embodiments of the disclosed technology.

Figure 11A:
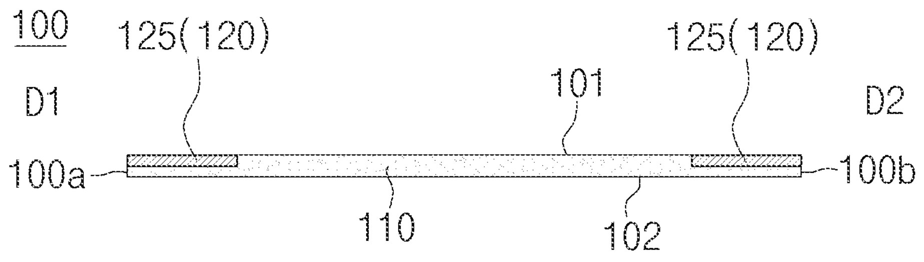
FIGS. 11A to 11E illustrate a cross section of a pad taken along D1-D2 of FIG. 10 based on some embodiments of the disclosed technology.

Referring to FIG. 11A, the plurality of heat generating columns 125 may form at least a portion of the first pad face 101. The plurality of heat generating columns 125 may include two heat generating columns 125. The two heat generating columns 125 may be respectively connected to the first pad edge 100*a* and the second pad edge 100*b*. The two heat generating columns 125 may be spaced apart from each other.

At least a portion of the pad body 110 may be disposed between the two heat generating columns 125. For example, at least a portion of the pad body 110 may form the central portion of the pad 100.

The process of forming the pad 100 is described. Both ends of the pad body 110 may form a stepped portion. For example, the first pad face 101 of the pad body 110 may form a stepped portion at both ends of the pad body 110. For example, the pad body 110 may include a stepped portion that is formed at both ends of the pad body 110 and is recessed in the first pad face 101.

In other words, a thickness of the pad body 110 at the central portion may be greater than a thickness of the pad body 110 at both ends. Both ends of the pad body 110 or both ends of the pad 100 may be connected to the first pad edge 100*a* and the second pad edge 100*b*, respectively. The two heat generating columns 125 may be disposed at both ends of the pad body 110.

Both faces of the pad 100 may be flat. For example, at least one of the first pad face 101 and the second pad face 102 may be flat.

A pair of pads 100 may be disposed between two adjacent battery cells 11 (see FIG. 4). For example, a second pad face 102 of one pad 100 of the pair of pads 100 may contact a second pad face 102 of the other pad 100 of the pair of pads 100. Hence, the pair of pads 100 can provide heat and distribute pressure while facing and contacting the two adjacent battery cells 11 (see FIG. 4), respectively.

Figure 11B:
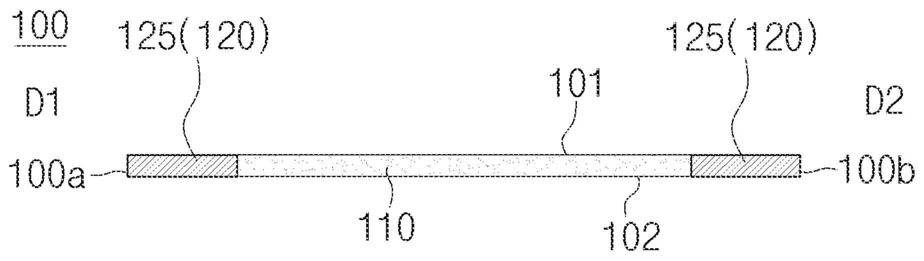

Referring to FIG. 11B, each of the plurality of heat generating columns 125 may extend from the first pad face 101 and lead to the second pad face 102. That is, each of the plurality of heat generating columns 125 may be connected to the first pad face 101 and the second pad face 102. In other words, each of the plurality of heat generating columns 125 may form at least a portion of the first pad face 101 and may form at least a portion of the second pad face 102.

The pad body 110 may be disposed between a pair of heat generating columns 125. The pad body 110 may connect the pair of heat generating columns 125. For example, the pad body 110 may be coupled to each of the pair of heat generating columns 125.

Figure 11C:
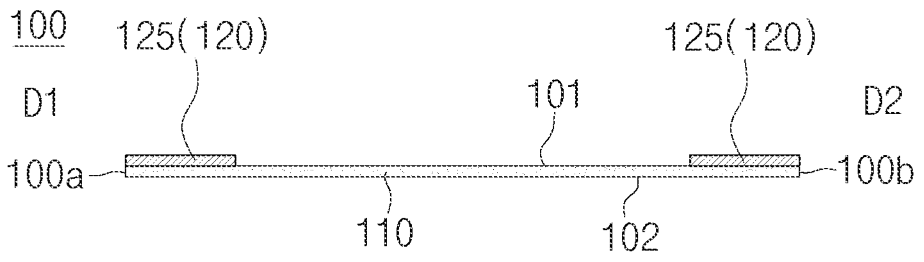

Referring to FIG. 11C, the pad body 110 may form a shape of a plate or a sheet. Both faces of the pad body 110 may be flat. A pair of heat generating columns 125 may be disposed on one face of the pad body 110. For example, the pair of heat generating columns 125 may be disposed on one face of the pad body 110 and may be respectively adjacent to the first pad edge 100*a* and the second pad edge 100*b*.

One face of the pad 100 may form a concave shape. For example, the first pad face 101 of the pad 100 may have a concave shape as a whole. The second pad face 102 of the pad 100 may be flat.

Since the first pad face 101 of the pad 100 forms the concave shape as a whole, the pad 100 can effectively contact the battery cell 11 (see FIG. 4). That is, since the first pad face 101 of the pad 100 forms the concave shape as a whole, the pad 100 can effectively absorb or distribute the pressure received from the battery cell 11 (see FIG. 4), and the pad 100 can effectively heat the battery cell 11 (see FIG. 4).

A pair of pads 100 may be disposed between two adjacent battery cells 11 (see FIG. 4). For example, a second pad face 102 of one pad 100 of the pair of pads 100 may contact a second pad face 102 of the other pad 100 of the pair of pads 100. Hence, the pair of pads 100 can provide heat and distribute pressure while facing and contacting the two adjacent battery cells 11 (see FIG. 4), respectively.

Figure 11D:
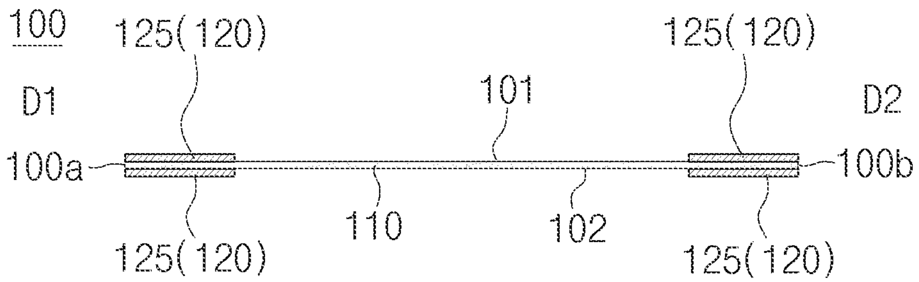

Referring to FIG. 11D, both faces of the pad body 110 may be flat. A pair of heat generating columns 125 may be disposed on one face of the pad body 110. For example, the pair of heat generating columns 125 may be disposed on the first pad face 101 of the pad body 110. The pair of heat generating columns 125 disposed on the first pad face 101 of the pad body 110 may be referred to as "a pair of first heat generating columns". The pair of first heat generating columns 125 may form a portion of the first pad face 101.

Another pair of heat generating columns 125 may be disposed on the other face of the pad body 110. For example, another pair of heat generating columns 125 may be disposed on the second pad face 102 of the pad body 110. The pair of heat generating columns 125 disposed on the second pad face 102 of the pad body 110 may be referred to as "a pair of second heat generating columns". The pair of second heat generating columns 125 may form a portion of the second pad face 102.

Figure 11E:
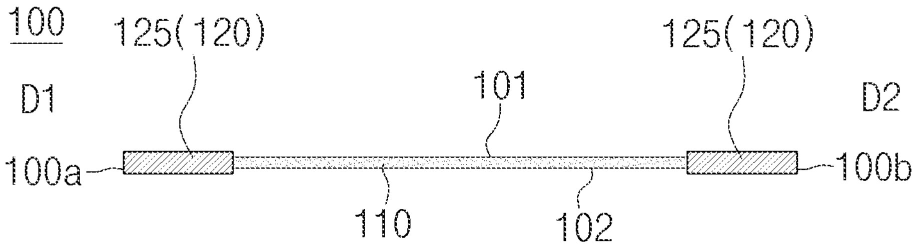

Referring to FIG. 11E, a pair of heat generating columns 125 may be connected to both ends of the pad body 110. In other words, the pad body 110 may be disposed between a pair of heat generating columns 125. A thickness of the heat generating column 125 may be greater than a thickness of the pad body 110.

Referring to FIGS. 11D and 11E, both faces of the pad 100 may form a concave shape. For example, each of the first pad face 101 and the second pad face 102 of the pad 100 may form a concave shape as a whole. Hence, the pad 100 can effectively absorb or distribute the pressure received from the battery cell 11 (see FIG. 4), and the pad 100 can effectively heat the battery cell 11 (see FIG. 4).

Figure 12:
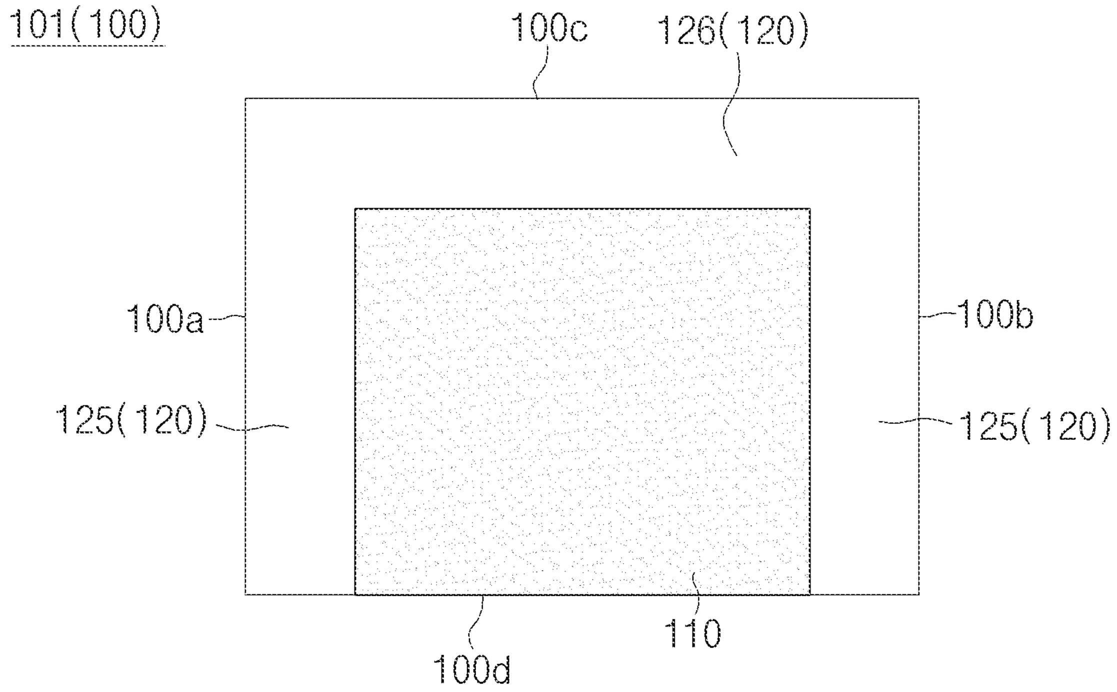
FIG. 12 illustrates one face of a pad that includes a heat generating part formed along an upper edge of the pad.

FIG. 12 illustrates one face of a pad in which a heat generating part is formed along an upper edge of the pad.

Referring to FIG. 12, at least a portion of the heat generating part 120 may be formed or disposed along the third pad edge 100*c* of the pad 100. The third pad edge 100*c* may be referred to as an upper edge of the pad 100. For example, the heat generating part 120 may include a heat generating beam 126 formed along an edge of the pad 100 opposite to the bottom plate 21 (see FIG. 4) among the edges of the pad 100.

The heat generating beam 126 may form a shape elongated in the front-rear direction. The heat generating beam 126 may connect a pair of heat generating columns 125 formed at both ends of the pad 100. For example, the heat generating beam 126 may be connected to each of upper ends of the pair of heat generating columns 125.

Figure 13:
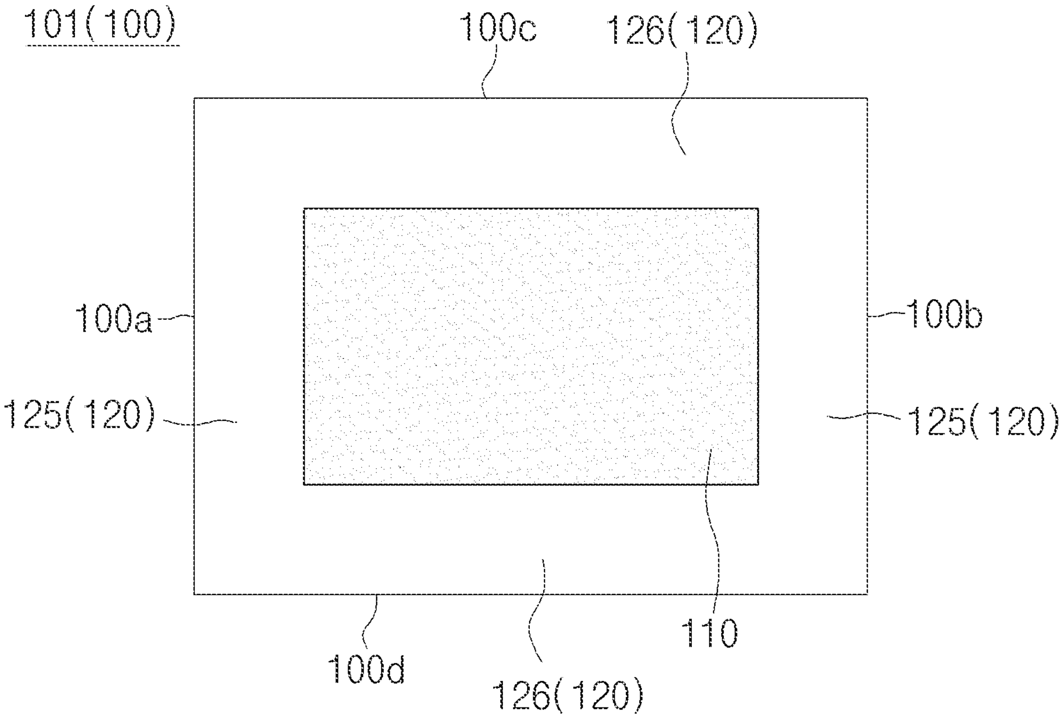
FIG. 13 illustrates one face of a pad that includes a heat generating part formed along a perimeter of the pad.

FIG. 13 illustrates one face of a pad in which a heat generating part is formed along a perimeter of the pad.

Referring to FIG. 13, the heat generating part 120 may be formed or disposed along the perimeter (100*a*, 100*b*, 100*c*, and 100*d*) of the pad 100. At least a portion of the pad body 110 may be covered by the heat generating part 120. In other words, the heat generating part 120 may be disposed along at least a portion of the perimeter of the pad body 110.

Referring to FIGS. 12 and 13, a cross section of the pad 100 may be similar to shapes of cross sections of the pad 100 illustrated in FIGS. 9A, 9B, 9C, 11A, 11B, 11C, 11D, and 11E.

Figure 14A:
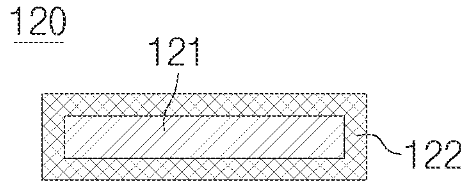
FIGS. 14A and 14B illustrate a cross section of a heat generating part.
Figure 14B:
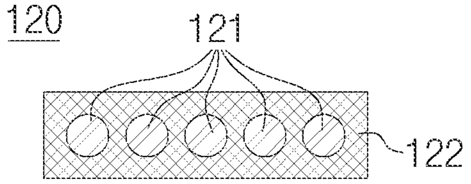

FIGS. 14A and 14B illustrate a cross section of a heat generating part.

Referring to FIGS. 14A and 14B, the heat generating part 120 may include a heat generating core 121. The heat generating core 121 may be formed of a material including an electrically conductive material. When current flows through the heat generating core 121, the heat generating core 121 may generate heat. When electric power is provided to the heat generating core 121, the heat generating core 121 may generate heat.

For example, the heat generating core 121 may be formed of a material including at least one of molybdenum, tungsten, Nichrome (alloy of nickel and chromium), copper, Kanthal (alloy of aluminum, chromium, and iron), an alloy of copper and nickel, and an alloy of molybdenum and tantalum.

The heat generating part 120 may include a heat generating outer shell 122. The heat generating outer shell 122 may form an outer surface of the heat generating part 120. The heat generating outer shell 122 may cover the heat generating core 121. The heat generating outer shell 122 may have electrical insulation. For example, the heat generating outer shell 122 may include a polymer.

The heat generating outer shell 122 may have thermal conductivity. For example, the heat generating outer shell 122 may include a thermally conductive resin. For example, the heat generating outer shell 122 may be formed of a material including at least one of a silicone-based resin and a polyurethane resin.

The heat generating outer shell 122 may receive heat from the heat generating core 121. The heat generating outer shell 122 may transfer at least a portion of the heat received from the heat generating core 121 to the battery cell 11 (see FIG. 4).

The heat generating outer shell 122 may receive heat from the battery cell 11 (see FIG. 4). The heat generating outer shell 122 may transfer at least a portion of the heat received from the battery cell 11 (see FIG. 4) to the bottom plate 21 (see FIG. 5).

Referring to FIG. 14A, the heat generating core 121 may form a strap shape. Referring to FIG. 14B, the heat generating core 121 may form a wire shape. For example, the heat generating core 121 may include a plurality of wires.

The disclosed technology can be implemented in rechargeable secondary batteries that are widely used in battery-powered devices or systems, including, e.g., digital cameras, mobile phones, notebook computers, and others. Specifically, the disclosed technology can be implemented in some portable battery storage devices for storing electrical energy generated from renewable energy sources such as solar power and wind power generators, thereby mitigating climate changes by reducing greenhouse gas emissions.

Only specific examples of implementations of certain embodiments of the disclosed technology are described in this patent document. Variations, improvements and enhancements of the disclosed embodiments and other embodiments may be made based on the disclosure of this patent document.

What is claimed is:

1. A battery cell assembly comprising:

a plurality of battery cells arranged in a direction; and one or more pads, each pad disposed between two adjacent battery cells of the plurality of battery cells, at least one of the one or more pads including:

a pad body that exhibits elasticity; and a heat generating part coupled to the pad body and extending toward an edge of the at least one of the one or more pads, and configured to generate heat upon application of electric power to the heat generating part, wherein the at least one of the one or more pads includes a first pad face and a second pad face positioned opposite to the first pad face, wherein the heat generating part includes one or more heat generating columns, wherein the heat generating columns disposed on the first pad face and the heat generating columns disposed on the second pad face are alternately disposed.

2. The battery cell assembly of claim 1, wherein the edge of the at least one of the one or more pads includes an upper end of the pad, and wherein the heat generating part includes the one or more heat generating columns extending downward from the edge of the at least one of the one or more pads.

3. The battery cell assembly of claim 2, wherein the one or more heat generating columns include a pair of heat generating columns that respectively extend downward from the edge of the at least one of the one or more pads and are spaced apart from each other.

4. The battery cell assembly of claim 3, wherein the pad body includes a pair of stepped portions recessed in the first pad face, and wherein the pair of heat generating columns are connected to the pair of stepped portions, respectively.

5. The battery cell assembly of claim 4, wherein the at least one of the one or more pads includes a pair of pads, and wherein the second pad faces of the pair of pads are arranged to face and contact each other.

6. The battery cell assembly of claim 3, wherein the pad body is disposed between the pair of heat generating columns.

7. The battery cell assembly of claim 6, wherein a thickness of each of the pair of heat generating columns is greater than a thickness of the pad body.

8. The battery cell assembly of claim 6, wherein each of the first pad face and the second pad face includes a concave surface.

9. The battery cell assembly of claim 3, wherein the pair of heat generating columns are coupled to the first pad face.

10. The battery cell assembly of claim 9, wherein the first pad face of the pad includes a concave surface.

11. The battery cell assembly of claim 10, wherein the at least one of the one or more pads includes a pair of pads, and wherein the second pad faces of the pair of pads are arranged to face and contact each other.

12. The battery cell assembly of claim 3, wherein the at least one of the one or more pads includes a first pad face and a second pad face positioned opposite to the first pad face, wherein the pair of heat generating columns include:

a pair of first heat generating columns forming a portion of the first pad face; and a pair of second heat generating columns forming a portion of the second pad face.

13. The battery cell assembly of claim 12, wherein each of the first pad face and the second pad face includes a concave surface.

14. The battery cell assembly of claim 1, wherein the edge of the at least one of the one or more pads includes an upper end of the pad, and wherein the heat generating part includes one or more heat generating beams extending along the edge of the pad.

15. The battery cell assembly of claim 1, wherein the heat generating part is arranged along a perimeter of the at least one of the one or more pads, and wherein at least a portion of the pad body is covered by the heat generating part.

16. The battery cell assembly of claim 1, wherein the heat generating part includes:

a heat generating core configured to generate heat upon application of electric power to the heat generating core; and a heat generating outer shell structured to cover the heat generating core and including an electrical insulation material.

17. A battery module comprising:

a battery cell assembly including a plurality of battery cells arranged in a direction;

a battery module case structured to accommodate the battery cell assembly; and one or more pads, each pad disposed between two adjacent battery cells of the plurality of battery cells, at least one of the one or more pads including:

a pad body with elasticity; and a heat generating part coupled to the pad body and extending toward an edge of the at least one of the one or more pads and configured to generate heat upon application of electric power to the heat generating part, wherein the at least one of the one or more pads includes a first pad face and a second pad face positioned opposite to the first pad face, wherein the heat generating part includes one or more heat generating columns, wherein the heat generating columns disposed on the first pad face and the heat generating columns disposed on the second pad face are alternately disposed.

18. The battery module of claim 17, wherein the battery module case includes a bottom plate forming a bottom of the battery module case, and the bottom plate is positioned under the at least one of the one or more pads, and wherein the heat generating part is connected to the bottom plate through a heat transfer unit that is positioned between the pad and the bottom plate and couples the at least one of the one or more pads to the bottom plate.

19. The battery module of claim 18, wherein the heat generating part includes:

a heat generating core configured to generate heat upon application of electric power to the heat generating core; and a heat generating outer shell structured to cover the heat generating core and including an electrically insulating material with thermal conductivity.

20. The battery module of claim 17, further comprising:

a heat generating unit including the heat generating part and a heat generating head, wherein the battery module case includes:

a bottom plate forming a bottom of the battery module case and positioned under the at least one of the one or more pads; and an upper case forming an upper face of the battery module case and positioned on the at least one of the one or more pads, wherein the edge of the pad forms an upper edge of the at least one of the one or more pads, wherein the heat generating head is electrically connected to the heat generating part to provide electric power to the heat generating part, and is disposed between the upper case and the at least one of the one or more pads.

* * * * *